(12) United States Patent
Bund

(10) Patent No.: US 8,471,515 B2
(45) Date of Patent: Jun. 25, 2013

(54) APPARATUS FOR OPERATING A MACHINE

(75) Inventor: Gerhard Bund, Lohr-Rodenbach (DE)

(73) Assignee: Robert Bosch GmbH, Stuttgart (DE)

(*) Notice: Subject to any disclaimer, the term of this patent is extended or adjusted under 35 U.S.C. 154(b) by 633 days.

(21) Appl. No.: 12/201,246

(22) Filed: Aug. 29, 2008

(65) Prior Publication Data
US 2009/0058343 A1    Mar. 5, 2009

(30) Foreign Application Priority Data

Aug. 30, 2007 (DE) .................. 10 2007 041 364
Oct. 13, 2007 (DE) .................. 10 2007 049 162

(51) Int. Cl.
*G05B 11/28* (2006.01)
(52) U.S. Cl.
USPC ........................................ 318/599; 318/811
(58) Field of Classification Search
USPC ............... 318/599, 811, 568.1, 568.22, 432, 318/569, 600
See application file for complete search history.

(56) References Cited

U.S. PATENT DOCUMENTS

| | | | | |
|---|---|---|---|---|
| 4,432,063 A * | 2/1984 | Resnick | ................ | 700/250 |
| 4,531,182 A * | 7/1985 | Hyatt | ................ | 700/2 |
| 4,772,831 A * | 9/1988 | Casler et al. | ................ | 318/568.15 |
| 4,829,419 A * | 5/1989 | Hyatt | ................ | 700/83 |
| 5,241,250 A * | 8/1993 | Nagasawa et al. | ................ | 318/591 |
| 5,429,682 A * | 7/1995 | Harlow et al. | ................ | 118/681 |
| 5,453,933 A * | 9/1995 | Wright et al. | ................ | 700/181 |
| 5,493,194 A | 2/1996 | Damiano et al. | | |
| 5,984,499 A * | 11/1999 | Nourse et al. | ................ | 700/5 |
| 6,522,949 B1 * | 2/2003 | Ikeda et al. | ................ | 700/245 |
| 6,697,681 B1 * | 2/2004 | Stoddard et al. | ................ | 700/17 |
| 2005/0209711 A1 * | 9/2005 | Ryegard et al. | ................ | 700/19 |

FOREIGN PATENT DOCUMENTS

| | | |
|---|---|---|
| DE | 197 23 956 | 12/1998 |
| DE | 101 45 517 | 4/2003 |
| EP | 1 720 083 | 11/2006 |
| WO | 03/081355 | 10/2003 |

* cited by examiner

*Primary Examiner* — Rina Duda
(74) *Attorney, Agent, or Firm* — Michael J. Striker

(57) ABSTRACT

An apparatus for operating a machine having electric axes includes a power module for supplying axis drives with electrical energy, an axis regulating module for regulating parameters of the axis drives, and an axis control module for controlling axis drives among one another. The modules are all interconnected with one another and located inside the apparatus as integral components of the apparatus. Synchronization is established between the functions of the modules, so that related courses of motion of a machine that is to be triggered are executed as precisely as possible.

36 Claims, 3 Drawing Sheets

APPARATUS FOR OPERATING A MACHINE

CROSS-REFERENCE TO RELATED APPLICATIONS

The invention described and claimed hereinbelow is also described in German Patent Applications DE 10 2007 041 364.7 filed on Aug. 30, 2007 and DE 10 2007 049 162.1 filed on Oct. 13, 2007. This German Patent Applications, whose subject matter is incorporated here by reference, provides the basis for a claim of priority of invention under 35 U.S.C. 119(a)-(d).

BACKGROUND OF THE INVENTION

The present invention relates to an apparatus for operating a machine having electric axes, in particular a processing machine, which executes courses of motion that have a functional relationship, and to a method for operating this apparatus.

From the prior art, digital multiaxial controllers for controlling real-time events, in particular courses of motion with a functional relationship, are known. German published patent application DE 197 239 56 A1, for instance, shows a digital multiaxial controller for controlling real-time events. The multiaxial controller includes a plurality of noncentral entities (CPUs), which can be synchronized to a central entity (central CPU) by means of a programmable clock signal.

The control is implemented such that each noncentral entity (CPU 2 through CPU n) is assigned its own electrical drive (A2 through An). Both central and noncentral entities each have an associated clock generator (Q1 through Qn) with which an operating clock pulse is generated. From the central entity CPU a, which can for instance be a numerical controller, a clock line leads to each noncentral entity. By way of this clock pulse, the corresponding noncentral entities can be synchronized to the central entity. In addition, all the distances communicate with one another by means of a bus system.

Drive and control applications that comprise multiple axes, such as machine tools, are equipped with such multiaxial controls. The embodiment described above, from the reference cited, has the disadvantage of highly complex wiring for clock lines and bus lines between the noncentral entities and the central entity, which can increase the risk of failure from run time and wiring errors, and thus can impair the operating safety. Moreover, the greater complexity of the wiring entails additional costs, since as a rule the wiring has to be done on-site by a technician. The transmissible quantities of data are limited on account of the field bus transmission and with increasing length of the lines, and idle time optimization options are also limited because of the existing lines. All in all, the embodiment shown in DE 197 239 56 A1 is a very complex approach, which leads to increased costs for machine maintenance and manufacture.

SUMMARY OF THE INVENTION

The object of the invention is to implement an inexpensive apparatus that requires little maintenance and that is suitable for operating machines with electric axes. Besides the cost aspect, the manipulation of the apparatus plays a major role, especially upon installation in the machine. The apparatus should be suitably compact and easy to install, so that with only a few manual actions, the technician can put the machine into operation by means of the apparatus.

The invention attains this object by means of an apparatus for operating a machine having electric (electrically device) axes (shafts); this apparatus includes a power module for supplying axis drives with electrical energy, an axis regulating module for regulating axis-specific parameters, and an axis control module for controlling axis drives among one another, and these aforementioned modules are interconnected inside the apparatus, as an integral component of the apparatus.

This has the advantage that the clock lines and field bus systems known from the prior art for connecting the noncentral and central entities can be dispensed with entirely, since the required wiring is effected inside the equipment, and the equipment is already fully wired when shipped, so that the customer need have no further consideration as to the wiring and need not go to any effort in that regard. The invention thus makes an apparatus available that already includes all the components for operating a machine with diverse axes. The wiring complexity is therefore reduced to a minimum and is limited merely to connecting the apparatus to the machine to be operated.

The apparatus makes both NC and SPS functionality available, so that multiaxial path interpolations and typical SPS applications can be implemented. The integrated drive regulator serves to regulate the motors included by the machine to be triggered. In addition, the apparatus can include visualization software, by means of which the users can configure and display the ongoing processes. Multiaxial embodiments without internal equipment wiring are thus possible in power ranges up to 25 kilowatts and more. In addition, a common cooling system can be used for the power module, the axis regulating module, and the axis control module, which reduces costs still further. A common user control unit can also be employed for all the modules, so that once again, cost saving can be attained.

The distinction from known embodiments is accordingly that among other things, all the functions of machine control and axial regulation are integrated in a single piece of equipment, and the modules communicating with one another are already pre-wired. Since as a rule all this equipment is accommodated in control boxes, the control box wiring can thus be reduced considerably and substantial savings can thus be attained.

Especially preferably, an apparatus control means is integrated into the apparatus, and by means of the apparatus control means, the chronological configuration of the courses of the apparatus functions implemented by the aforementioned modules is accomplished. As a result, it is possible for the first time to enable absolutely synchronous operation in terms of power, regulation, and control, so that for instance the drive regulation can proceed synchronously with path interpolation performed by a drive controller. Moreover, idle times between generating the set-point values and processing them are shortened, since because of the internal wiring and the attendant absence of such line lengths as are predominant in the prior art, hardly any protocol transmission time is required, either.

Especially preferably, the apparatus control means 5) is implemented by means of a programmable logic, which could for instance be an FPGA (field programmable array), and this programmable logic is additionally included by at least one of the modules. Preferably, the apparatus control means is located on the axis regulating module. The axis regulating module and the apparatus control means thus form an integral component of the apparatus for operating a machine. The advantage of this embodiment is also its cost aspect. Programmable logic components can be procured inexpensively and in contrast to conventional processors can execute a plurality of logic instructions in parallel, which is advantageous for implementing synchronous operations.

Quite particularly preferably, the communication between at least two modules is implemented by means of the apparatus control means. These modules are advantageously the axis regulating module and the axis control module. However, it is also conceivable to implement communication between the power module and the axis control module. This characteristic makes it possible to dispense with the use of an external bus system. The communication is effected by means of printed circuits located on a conductor track, which are located on the printed circuit boards on which the modules are based.

Preferably, the apparatus control means includes a time-controlled signal generating means or generating control signals for the modules, in particular for the axis regulating module and the axis control module. By means of these control signals, it is possible to effect the execution of program code in conjunction with interrupt requests (interrupts) for at least one of the modules.

Alternatively or in addition, it is possible for the apparatus control means itself to be clocked or operated by means of the apparatus control means. It is thus possible in a targeted way to vary the function of the modules triggered by means of the control signals and thus to synchronize the modules with regard to their function. In addition, processes taking place inside the apparatus control means, if they are likewise controllable by means of the control signals, can be synchronized with the module functions in the same manner. This helps reduce any delays between the module functions and/or the apparatus control means functions to a minimum.

Advantageously, the apparatus control means includes at least two function blocks, by means of which at least two modules can be connected to the apparatus control means, so that the control signals, generated by the signal generating means, for the connectable modules for implementing an interrupt request for the connectable modules can be forwarded to the modules, and/or so that communication between the connectable modules is capable of being implemented, and in particular the axis control module is connected to the first function block, and the axis regulating module is connected to the second function block. Finally, the function blocks act as interfaces between the modules and the apparatus control means.

Preferably, the function blocks include interfaces for exchanging data relevant to the operation of the machine between the apparatus control means and the modules and optionally between the various modules. These data may for instance be set-point- or actual-value transmissions, which may be of interest for both the axis regulating module and for the axis control module. These data can likewise be processed inside the apparatus control means, for instance in conjunction with measurement operations or evaluations of the feedback signals, so that a capability of forwarding the data on to the apparatus control means may also be useful.

Quite particularly preferably, the supply of energy to machine axes is controllable by means of the apparatus control means, using the power module. In particular, the pulse width modulator required for generating the drive/trigger currents could be triggered, using the apparatus control means, so that the triggering of this pulse width modulator could, for instance synchronously, be brought into agreement with processes taking place on the axis control module or the axis regulating module.

The functions of the axis regulating module and of the axis control module are implemented by means of a separate computation unit assigned to the respective module, and this computation unit is operated in particular by means of a real-time operating system. The scheduler of one or both real-time operating systems can likewise be generated by the control signals generated by the apparatus control means, so that the real-time operating system can also be synchronized relative to other apparatus functions. The result is manifold possible ways of synchronizing all the components of the apparatus of the invention with one another, or of subjecting them to a predetermined time matrix.

Advantageously, an external user control unit can be connected to the apparatus of the invention, and by means of it, all the components of the apparatus can be configured and monitored. It would also be possible for this user control unit as well to be integrated with the apparatus.

Preferably, a processing machine, in particular a machine tool, is equipped with and operated by an apparatus as defined by one of the foregoing claims. However, manifold other applications are possible; for instance, a robot arm could be equipped with and operated by an apparatus according to the invention.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
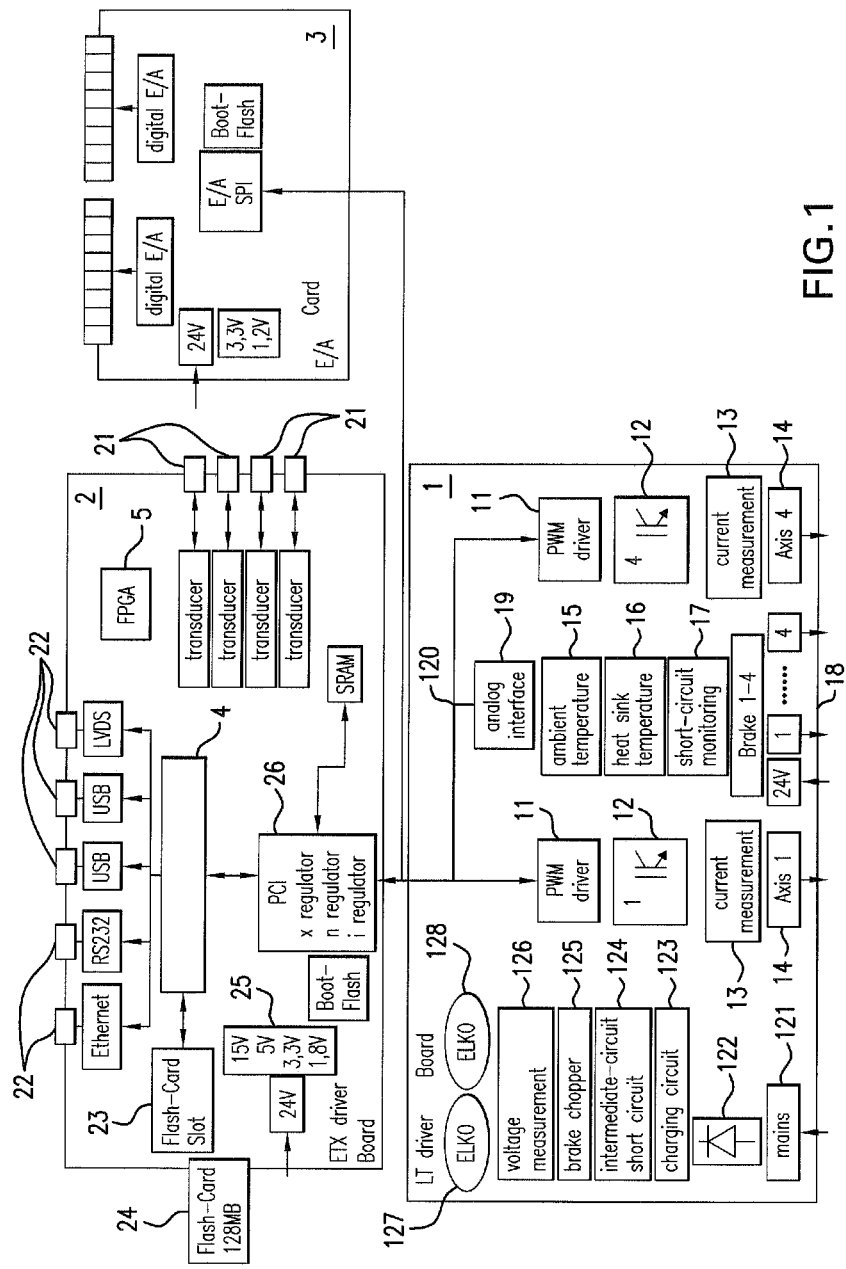
FIG. 1 shows as an example the implementation of the apparatus of the invention by means of various integrated and wired modules.

In the ensuing description of the drawings, identical reference numerals identify identical components of the apparatus.

FIG. 1 shows four printed circuits on separate circuit boards 1, 2, 3, 4 as they have been implemented for a prototype of the apparatus according to the invention. It is understood that both the location of the components relative to one another on the circuit boards 1, 2, 3, 4 and the implementation of the function blocks on the circuit boards 1, 2, 3, 4 can be implemented by means of modifications by one skilled in the art or in an altered form, without departing from the scope of the concept according to the invention.

The lower circuit board 1 in the drawing represents the so-called power module 1 of the apparatus of the invention. This power module 1 serves to supply the axis drives of a machine that is operated by means of the apparatus. The supply is effected by means of a three-phase supply voltage. For instance, four axes can be triggered by means of the power module 1 shown here. To that end, the circuit board 1 includes one driver 11 for each axis, for triggering a transistor module or IGBT module 12, a current meter 13, and an interface for connecting the axes 14 that are to be driven. This concept can be expanded to further axes, such as six or eight axes. It could likewise be reduced to fewer than four axes. Also included in addition to the module 1 are an electronic circuit for monitoring the ambient temperature 15, a circuit for monitoring the heat sink temperature 16, and a circuit for short-circuit monitoring 17. Four motor brakes can also be connected to the circuit board. The number of brake connections 18 is always equal to the number of motor brakes. The PWM driver 11 and an analog interface 19 communicate with the computation unit of the axis regulating module 2, to be described hereinafter, by means of the data bus 120.

In addition, the power module 1 includes a mains connection 121, for instance for a three-phase network, and a rectifier 122, which converts the three-phase voltage supplied into an intermediate-circuit voltage. The intermediate circuit then furthermore includes a charging circuit 123, an intermediate-circuit short-circuit monitor 124, a brake chopper 125, and a voltage measuring circuit 126. An external resistor is connected to the brake chopper 126 and converts the excess energy into heat in the event of current feedback.

Also shown in this embodiment are two electrolyte capacitors 127 and 128, which can serve to buffer the intermediate circuit. Alternatively, and optionally separately from the power module 1, however, an energy-storing module may also be provided as an external buffer (not shown), which is equipped with many electrolyte capacitors. The energy-storing module (not shown) would then be a further integral component of the apparatus.

The power module 1 is mounted on a heat sink (not shown), specifically in such a way that the IGBT modules 12 rest directly on the heat sink. In the mounted state, a cooling and ventilation module (not shown) would be provided later, serving to subject both the heat sink and the apparatus modules 1, 2, 3, 4 to cooling air. There are two possible embodiments for the power module 1. The first embodiment would be a version by means of an inverter, which converts a supplied intermediate-circuit direct voltage into a three-phase voltage for operating the motors. A second possible embodiment is the version with a frequency converter. In this version, an alternating voltage is supplied to the power module 1 by means of the mains connection 121 and converted by means of the rectifier 122 and intermediate circuit 124 back into an alternating voltage of a different frequency.

In FIG. 1, the axis regulating module 2 is also shown. The axis regulating module 2 serves to regulate machine axis drives that are to be triggered. The regulating software for the axis regulation is implemented executably in the axis regulating module 2 by means of a processor 26 or computation unit 26. For the axis regulation, the power module 2 includes various inputs 21 for feedback units, which can detect the rpm and/or the position of the axis drives and can forward them to the axis regulating module 2 for purposes of regulation. The board 2 also includes various connections 22, such as an Ethernet connection, an RS232 connection, a USB connection, and an LVDS connection. In the final analysis, all these connections 22 serve the purpose of communication with peripherals that can be connected to the board 2 or the apparatus. These could for instance be a user control unit, an external computer, or an additional control and regulating component (not shown). Further components included by the power module 2 are for example drawers 23 for external storage media, such as flash cards 24, and various voltage supplies 26 for operating integrated circuits installed on the board 2. By means of the processor 26, the communication between the power module 1 and the axis regulating module 2 is also realized by means of bus 120.

A further module 3 can optionally be connected to the data bus 120. This module 3 is a digital input/output unit. However, the power module 1 intrinsically already includes digital input/output units, and the additional module 3 is not absolutely necessary, although it does have the advantage of making the apparatus expandable.

In FIG. 1, the axis control module 4 can also be seen, which is a separate unit, but is plugged directly into a corresponding connection base on the axis regulating module 2. The axis control module 4 represents a fully functional processor module 4, including memories and interfaces, which includes firmware that runs by means of a real-time operating system. By means of this firmware, the complete control functionality of the apparatus is simulated. The apparatus can include the function not only of a programmable controller (SPS) but also alternatively or in addition the function of multiaxial path interpolation and/or process visualization. Axis control and axis regulation are accordingly implemented independently of one another, by means of different hardware and different software in separate modules 2, 4, but can also communicate with one another.

An apparatus control means 5 is proved in the axis regulating module 2. This apparatus control means 5 serves to take over the chronological coordination of the courses of the apparatus functions that are implemented by means of the modules 1, 2 and 4. The apparatus control means 5 is preferably implemented by means of a programmable logic, such as FPGA, and could alternatively be located on the power module 1 or the axis control module 4 instead. The apparatus control means 5 preferably also coordinates the communication among all the apparatus modules 1, 2, 4, and optionally module 3.

As already mentioned, the power module 1 is mounted on a heat sink (not shown). In addition, a retaining device (not shown) is attached to the long sides of the heat sink and serves the purpose on the one hand of mounting the apparatus in a control box and on the other of fixing the axis regulating module 2 so that it can be located parallel to the power module 1 and the heat sink. Between the plane of the power module circuit board 1 and the axis regulating module board 2, located parallel to the power module circuit board by means of the retaining device, cooling air can flow, which is generated by the heat sink fan (not shown). The retaining device additionally serves to receive a housing cover that protects the entire assembly. The completely installed equipment can then be installed in the control box by means of the retaining devices in such a way that the connections of the equipment are accessible from the front of the control box when the control box door is open. The retaining device additionally includes a ground connection for grounding the apparatus. A screen overlay for the provision of shielding is also included by the retaining device.

Figure 2:
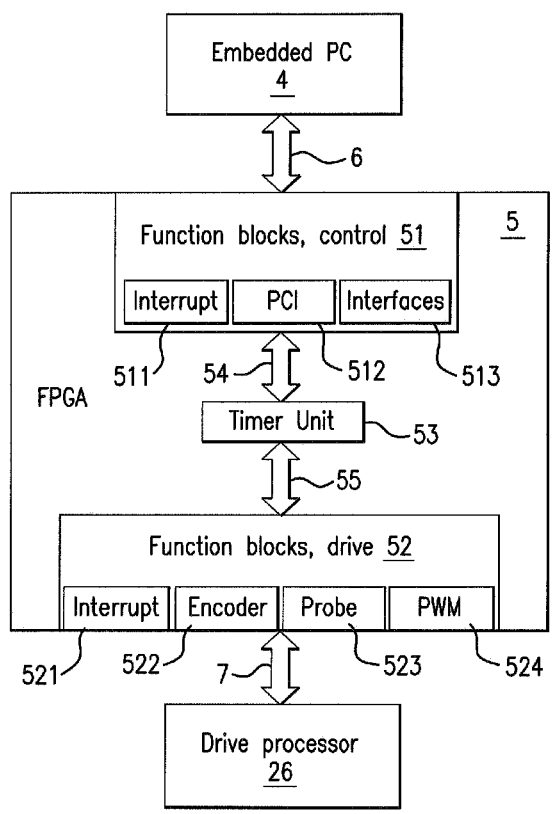
FIG. 2 is a basic circuit diagram of the apparatus control means and its function blocks.

FIG. 2, schematically and in somewhat more detail, shows the makeup of the apparatus control means 5 already mentioned (see circuit board 2 in FIG. 1). In FIG. 2, the processor 4 already known from the description of FIG. 1 is shown again and in the final analysis represents the axis control module. This processor communicates with the apparatus control means 5, by means of a bidirectional data connection 5, in such a way that the two components can exchange data with one another. The processor 26, also already known from the description of FIG. 1, is also shown for the axis regulating module 2 and can likewise communicate with the apparatus control means 5 by means of a bidirectional data connection 7.

The internal makeup, shown, of the apparatus control means 5 is represented purely schematically by means of function blocks. The apparatus control means 5 comprises at least two function blocks 51 and 52; the first function block 51 is intended for the computation unit 4 of the axis control module 2, and the second function block 52 is intended for the processor 26 of the axis regulating module 2. The connection of the processors 26 and 4 to the apparatus control means is implemented in terms of circuitry by means of the two function blocks 51, 52.

The function blocks 51, 52 in turn include further components, which are represented by means of the blocks 511, 512, 513 and 521, 522, 523 and 524 shown in FIG. 2. The function block 51 for instance includes a means 511 for forwarding interrupt requests to a connected axis control module processor 4. The function block 51 further includes a communication interface 512, so that the axis control module processor 4 can exchange data of any kind with the apparatus control means 5.

By means of the interface 512, data can be transmitted from the axis control module processor 4 to the drive regulation module processor 26, and vice versa, by means of the data bus 6, the function block 51, the internal data bus 54 and 55, and the signal generating means 53 as well as the function block 52 and the data bus 7.

In addition, further interfaces 513 can be provided for the function block 51, such as a field bus interface or a SERCOS interface. The function block also offers interfaces 5113 for the purposes of debugging and diagnosis. By means of these debugging and diagnosis interfaces, it is possible to monitor the system or the apparatus according to the invention during operation and find possible sources of error early. By means of the interfaces 513, existing interfaces of the drive control 4 can thus be expanded.

The function block 52 for connecting the processor 26 of the axis regulating module 2 likewise comprises a plurality of individual components. Here again, a unit 521 is provided for forwarding interrupt requests to the processor 26. An encoder interface 522 for application in conjunction with position transducer signals is also provided. A PWM interface 524 allows the triggering of the pulse width modulator (PWM modulator) for triggering of the power semiconductor 12 by means of the PWM drier 11 on the power module 1 by the apparatus control means 5.

The encoder 522 included by the function block 52 for the drive regulating module 2 can evaluate feedback units, connected to the apparatus of the invention, synchronously with the signal of the signal generating means 53. A plurality of encoder interfaces 522 from different manufacturers can be provided. For instance, an interface on the EnDat or Hyperface standard would be conceivable. Simple square-wave or sine-wave transducer connections or other manufacturer-specific transducer interfaces may be provided (such as a Panasonic interface, etc.). All the interfaces can be evaluated simultaneously by means of the signal generating means 53, which makes exact path interpolation possible.

The probe interface 523 is capable of receiving connected digital measured values. For instance, a plurality of inputs could be provided that evaluate positive and negative signal edges separately. The measurement is then done synchronously to the encoder signal evaluation, controlled by the apparatus control means 5, in order for instance to calculate axial positions exactly, as a function of the occurrence of an external event detected by measurement, by means of one of the computation units included by the apparatus.

The signal generating means 53 serves to generate control signals. This signal generating means 42 has been implemented here by means of a timer 53 and can communicate with both function blocks 51, 52 by means of bus 54, 55. The signal generating means 53 is implemented such that it can both generate control signals and process data. It is also possible by means of the signal generating means 53 to establish a direct communications connection between the processor 4 of the axis control module 1 and the processor 26 of the axis regulating module 2. The signal generating means 53 therefore not only serves to generate signals but also acts as a communications interface between the module processors 4 and 26.

It is also conceivable to provide still further module interfaces on the apparatus control means 5. For instance, the apparatus control means could also have another separate function block for the power module 1, so that the power module can get into contact with the other modules 2, 3 or can accept signals directly form the signal generating means 53. By means of the signal generating means 53, among other things signals that are recognized by the processors 4 and 26 as interrupts can be forwarded to the respective function blocks 51 and 52. The interrupts are forwarded between the processors 4 and 26 by means of the bidirectional data connection 6, 7 and to the processors 4 and 26 by means of the function blocks 51 and 52 of the apparatus control means 5. The respective processor 4, 26 recognizes the interrupt and starts an interrupt-service routine that is intended for that interrupt. The data processing in the axis control module processor 3 or in the axis regulating module processor 2 is thus controllable directly by the signal generating means 53. It is thus possible for modules triggered by the apparatus control means 5, or their functionality, to be varied purposefully in conjunction by means of the interrupt lines and thus to establish synchronicity.

Figure 3:
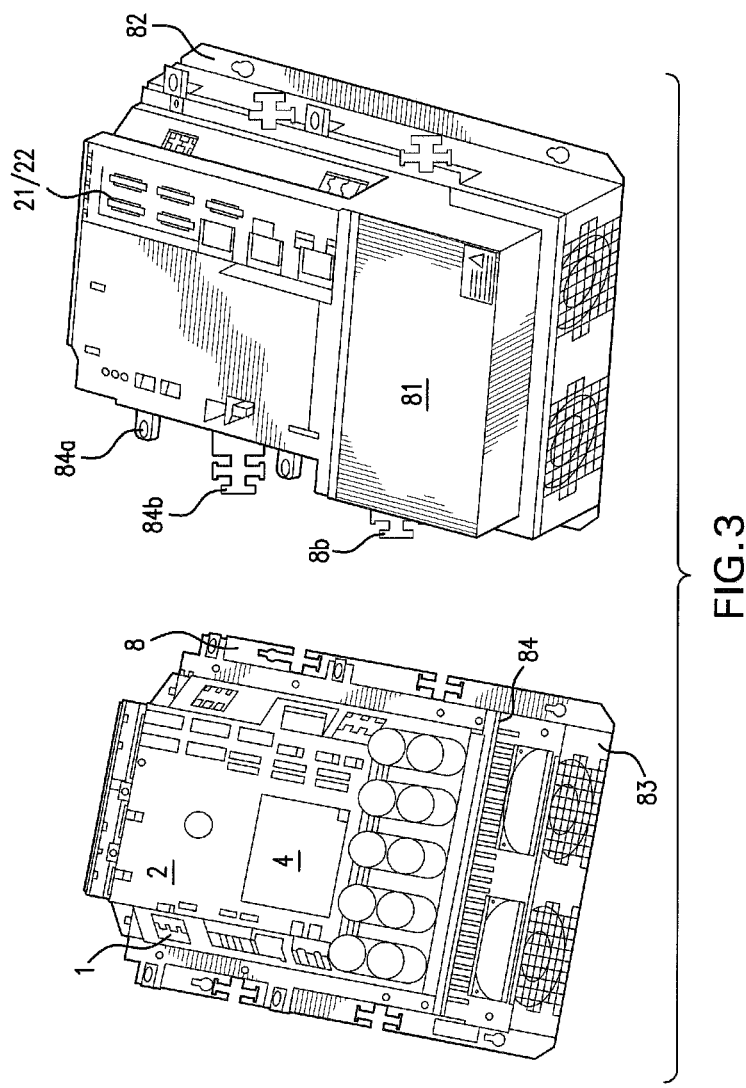
FIG. 3 shows the apparatus of the invention in the installed state, with and without covering (on the right and left, respectively).

In FIG. 3, the apparatus according to the invention is shown in the installed state, with a housing 31 (on the right) and without it (on the left). In the drawings on the left and right, the retaining device 82 can be seen, which is for securing the apparatus inside a control box and for locking the apparatus modules 1, 2, 3 and 4 as well as an energy-storing module 9 that is optionally present. The fan module 83 can also be seen, along with the heat sink 84 on which the power module 1 is additionally located. The covering 81 protects the entire assembly from dirt and environmental influences. The covering 81 moreover includes recesses for the connections 21 and 22 of the axis regulating module 2 and for input/output units, optionally in conjunction with the optional expansion module 3. Grounding and shielding that are present in the control box can be located at the connections 84a and 84b of the retaining device 82. The mains connection 121 is likewise accessible from outside the housing 81, but is not visible in this drawing.

The apparatus according to the invention has the advantage that it can execute both the regulation operations and the path interpolation operations absolutely synchronously, with the least possible jitter. Additionally, because of the short communication distances, idle times and transit times between the apparatus modules 1, 2, 3 and 4 are reduced to a minimum, so that for instance between the set-point value generation in the computation units and the actual processing in the drive, only negligible transit times occur. With regard to the protocol transmission times, this improves the precision and reliability of the related courses of motion that are executed in the machine triggered by the apparatus of the invention.

It will be understood that each of the elements described above, or two or more together, may also find a useful application in other types of constructions and methods differing from the types described above.

While the invention has been illustrated and described as embodied in an apparatus for operating a machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. An apparatus for operating a machine having multiple, electrically-operated axes, which execute sequences courses of motion with a functional relationship, the apparatus comprising:
   a housing, wherein said apparatus is configured for use in a switch cabinet;
   a power module for supplying axis drives with electrical energy;
   an axis regulating module for regulating axis-specific parameters;
   an axis control module for controlling the multiple axis drives among one another, wherein said power module, said axis regulating module, and said axis control module are connected to one another as an integral component of the apparatus within the housing; and
   an apparatus controller for implementing a chronological coordination of a sequence of functions of the apparatus implemented by said modules, said apparatus controller being an integral component of the device, wherein said apparatus controller is configured so as to implement a communication between at least two of said modules, wherein said apparatus controller is configured to control the supply of energy to the machine axes using said power supply module; and
   at least one real-time operating system in a separate processing unit assigned to a respective one of said modules, wherein the functions of the axle regulator module and the axle control module are realized via said at least one real-time operating system, and wherein both real-time operating systems are controllable by said apparatus controller.

2. An apparatus for operating a machine as defined in claim 1, wherein the apparatus is configured for operating the machine that is a processing machine which executes courses of motion with a functional relationship.

3. An apparatus for operating a machine as defined in claim 1, wherein said apparatus controller is configured as a programmable logic that is included by at least one of said modules.

4. An apparatus for operating a machine as defined in claim 1, wherein said apparatus controller includes time-controlled signal generating means for generating control signals for said modules, such that an execution of a program code in conjunction with interrupt requests for at least one of said modules is controllable by said control signals, and such that said control signals control functions of said apparatus controller.

5. An apparatus for operating a machine as defined in claim 4, wherein said apparatus controller includes at least two function blocks by which at least two of said modules are connectable to said apparatus controller, so that said control signals generated by said signal generating means, for said modules which are connectable, for implementing an interrupt request for said connectable modules are forwardable to said modules and/or so that communication between the said connectable modules is implementable, said axis control module being connected to said first function block, while said axis regulating module is connected to said second function block.

6. An apparatus for operating a machine as defined in claim 5, wherein said function blocks include interfaces for exchanging data relevant to an operation of the machine between said apparatus controller and said modules and for exchanging such data between said modules.

7. An apparatus for operating a machine as defined in claim 1, wherein said apparatus controller is configured to control the supply of energy to the machine axes using said power supply module with a pulse width modulation provided for generating drive trigger cards.

8. An apparatus for operating a machine as defined in claim 1, further comprising a user control unit connectable to the apparatus.

9. An apparatus for operating a machine as defined in claim 1, further comprising a further module formed as an input/output unit which is an integral component of the apparatus and located inside the apparatus at at least one of said modules by a docking interface.

10. An apparatus for operating a machine as defined in claim 1, wherein the apparatus includes visualization software by means of which users can configure and display ongoing processes.

11. An apparatus for operating a machine as defined in claim 1, further comprising a common cooling system for the power module, the axis regulating module and the axis control module.

12. An apparatus for operating a machine as defined in claim 1, wherein the modules communicating with one another are already pre-wired.

13. An apparatus for operating a machine as defined in claim 3, wherein the programmable logic is a field programmable array (FPGA).

14. An apparatus for operating a machine as defined in claim 1, wherein the communication is effected by means of printed circuits located on a conductor track which are located on printed circuit boards on which the modules are based.

15. An apparatus for operating a machine as defined in claim 1, wherein the apparatus controller itself is to be clocked ore operated by means of the signal generating means.

16. An apparatus for operating a machine as defined in claim 1, wherein an external user control unit is connected to the apparatus by means of it, all the components of the apparatus are configured and monitored.

17. An apparatus for operating a machine as defined in claim 1, wherein a user control unit is integrated with the apparatus.

18. An apparatus for operating a machine as defined in claim 1, wherein the power module further includes one driver for each axis for triggering a transistor module or IGBT module.

19. An apparatus for operating a machine as defined in claim 1, wherein the power module further includes a current meter.

20. An apparatus for operating a machine as defined in claim 1, wherein the power module further includes an interface for connecting the axes that are to be driven.

21. An apparatus for operating a machine as defined in claim 1, wherein the apparatus includes in addition an electronic circuit for monitoring an ambient temperature and/or a circuit for monitoring a heat sink temperature and/or a circuit for short-circuit monitoring.

22. An apparatus for operating a machine as defined in claim 1, wherein motor brakes are connected to the power module.

23. An apparatus for operating a machine as defined in claim 1, wherein a PWM drive and an analog interface communicate with a computation unit of the axis regulating module by means of a data bus.

24. An apparatus for operating a machine as defined in claim 1, wherein the power module further includes a main connection and/or a rectifier and/or at least one electrolyte capacitor.

25. An apparatus for operating a machine as defined in claim 1, wherein an energy-storing module is provided as an external buffer.

26. An apparatus for operating a machine as defined in claim 1, wherein the power module is mounted on a heat sink.

27. An apparatus for operating a machine as defined in claim 1, wherein a regulating software for the axis regulation is implemented executably in the axis regulating module by means of a processor or a computation unit.

28. An apparatus for operating a machine as defined in claim 1, wherein the axis regulating module includes various connections and/or drawers for external storage media and/or various voltage supplies for operating integrated circuits.

29. An apparatus for operating a machine as defined in claim 13, wherein an input/output unit is connected to the data bus.

30. An apparatus for operating a machine as defined in claim 1, wherein the axis control module further includes memories and interfaces, which include firmware that runs by means of a real-time operating system.

31. An apparatus for operating a machine as defined in claim 1, wherein the apparatus further includes the function of a programmable controller (SPS) and/or the function of a multiaxial path interpolation and/or process visualization.

32. A method for operating an apparatus for operating a machine having multiple, electrically-operated axes, which execute sequence of motions with a functional relationship, comprising the steps of:
providing a housing, wherein said apparatus is configured for use in a switch cabinet;
supplying multiple axis drives with electrical energy by a power module, wherein said power module, said axis regulating module, and said axis control module are connected to one another as an integral component of the apparatus within the housing;
regulating axis specific parameters by an axis regulating module;
controlling the axis drives among one another by an axis control module;
interconnecting the modules as an integral component of the apparatus;
generating by an apparatus controller at least one control signal courses over time of functions implemented by at least two of the modules are syncronolous with one another, wherein said apparatus controller controls the supply of energy to the machine axes using said power module;
providing at least one real-time operating system in a separate processing unit assigned to a respective one of said modules, wherein the functions of the axle regulator module and the axle control module are realized via said at least one real-time operating system, and wherein both real-time operating systems are controllable by said apparatus controller.

33. A method for operating an apparatus for operating a machine as defined in claim 32; and further comprising controlling by the control signal a start of a program code in conjunction with tripped interrupt requests for the modules and/or a start of program control mechanisms of real-time operating systems implemented on the modules.

34. A method for operating an apparatus for operating a machine as defined in claim 32, further comprising evaluating motor feedback units by the control signal.

35. A method for operating an apparatus for operating a machine as defined in claim 32, further comprising evaluating measured values by the control signal.

36. A method for operating an apparatus for operating a machine as defined in claim 32, further comprising controlling by the control signal a current triggering of the drives connected to the apparatus by the power module.

* * * * *